(12) United States Patent
Elangovan et al.

(10) Patent No.: US 11,914,454 B2
(45) Date of Patent: Feb. 27, 2024

(54) TRUE HIGH AVAILABILITY OF WORKLOADS IN A CLOUD SOFTWARE-DEFINED DATA CENTER

(71) Applicant: VMware LLC, Palo Alto, CA (US)

(72) Inventors: Selventhiran Elangovan, Bangalore (IN); Vinaya Lingappa Hanumantharaya, Bangalore (IN); Dinesh Raju Chamarthi, Bangalore (IN); Kiran Eshwarappa, Austin, TX (US)

(73) Assignee: VMware, Inc., Palo Alto, CA (US)

( * ) Notice: Subject to any disclaimer, the term of this patent is extended or adjusted under 35 U.S.C. 154(b) by 892 days.

(21) Appl. No.: 15/597,172

(22) Filed: May 17, 2017

(65) Prior Publication Data

US 2018/0181418 A1   Jun. 28, 2018

(30) Foreign Application Priority Data

Dec. 22, 2016  (IN) ............................. 201641043841

(51) Int. Cl.
*G06F 11/07* (2006.01)
*G06F 9/455* (2018.01)
*G06F 11/20* (2006.01)
*H04L 47/74* (2022.01)

(52) U.S. Cl.
CPC ...... *G06F 11/0712* (2013.01); *G06F 9/45558* (2013.01); *G06F 11/203* (2013.01); *H04L 47/746* (2013.01); *G06F 2009/45562* (2013.01); *G06F 2201/815* (2013.01)

(58) Field of Classification Search
CPC ............. G06F 11/0712; G06F 9/45558; G06F 11/203; G06F 2201/815; G06F 2009/45562; G06F 30/20; G06F 30/25; G06F 30/27; G06F 30/28; H04L 47/746
See application file for complete search history.

(56) References Cited

U.S. PATENT DOCUMENTS

| | | | |
|---|---|---|---|
| 5,805,790 A * | 9/1998 | Nota .................. | G06F 11/1402 714/10 |
| 8,554,981 B2 | 10/2013 | Schmidt et al. | |
| 8,924,967 B2 | 12/2014 | Nelson et al. | |
| 2009/0282404 A1* | 11/2009 | Khandekar ......... | G06F 9/45558 718/1 |
| 2011/0231899 A1* | 9/2011 | Pulier .................. | H04L 63/102 726/1 |

(Continued)

*Primary Examiner* — Michael Edward Cocchi
(74) *Attorney, Agent, or Firm* — King Intellectual Asset Management (57) ABSTRACT

In accordance with an embodiment of the invention, a cloud computing system is disclosed. The system includes a software-defined data center (SDDC), the SDDC including at least one cluster supported within the SDDC and at least one host computer running within the cluster, wherein the at least one host computer is configured to support at least one workload comprising an operating system and an application, and a cloud infrastructure, the cloud infrastructure including at least one child VM, the at least one child VM configured to virtualize the at least one host computer running within the cluster, and at least one parent virtual machine, wherein additional child VMs are deployed by forking the at least one parent VM.

12 Claims, 12 Drawing Sheets

(56) References Cited

U.S. PATENT DOCUMENTS

| | | | |
|---|---|---|---|
| 2012/0311576 A1* | 12/2012 | Shu | G06F 9/4818 |
| | | | 718/1 |
| 2013/0036404 A1* | 2/2013 | Shu | G06F 11/3676 |
| | | | 717/127 |
| 2014/0019963 A1* | 1/2014 | Deng | G06F 9/45558 |
| | | | 718/1 |
| 2015/0058619 A1* | 2/2015 | Sweet | H04L 63/0428 |
| | | | 713/155 |
| 2015/0058663 A1* | 2/2015 | Schmidt | G06F 9/455 |
| | | | 714/6.24 |
| 2015/0095432 A1* | 4/2015 | Soundararajan | H04L 51/52 |
| | | | 709/206 |
| 2015/0178107 A1* | 6/2015 | Gummaraju | G06F 9/45558 |
| | | | 718/1 |
| 2015/0178108 A1* | 6/2015 | Tarasuk-Levin | G06F 9/45558 |
| | | | 718/1 |
| 2015/0178109 A1* | 6/2015 | Li | G06F 9/45558 |
| | | | 718/1 |
| 2015/0237081 A1* | 8/2015 | Taylor | H04L 67/01 |
| | | | 709/223 |
| 2019/0288956 A1* | 9/2019 | Pulier | G06F 9/45558 |

* cited by examiner

TRUE HIGH AVAILABILITY OF WORKLOADS IN A CLOUD SOFTWARE-DEFINED DATA CENTER

RELATED APPLICATIONS

Benefit is claimed under 35 U.S.C. 119(a)-(d) to Foreign Application Serial No. 201641043841 filed in India entitled "TRUE HIGH AVAILABILITY OF WORKLOADS IN A CLOUD SOFTWARE-DEFINED DATA CENTER", on Dec. 22, 2016, by VMware, Inc., which is herein incorporated in its entirety by reference for all purposes.

BACKGROUND

A wide range of redundancy techniques have been employed in highly available computing systems. In general, such techniques seek to replicate hardware, systems, components, subsystems or even software so that, in the event of a failure, relevant functionality may be maintained or at least quickly recovered. Redundancy may be provided at any of a variety of levels. For example, in information storage or transmission, it is common to manage redundant storage or transmission using error correcting codes (ECC), cyclic redundancy checks (CRC) and/or storage array technologies such as RAID ("Redundant Array of Inexpensive Disks) or as often deployed in storage attached network (SAN) architectures. Redundant subsystems such as power supplies or storage controllers are often employed to improve system availability. In some fault-tolerant designs, fully redundant replicated hardware is employed at all levels and duplicate (and ostensibly identical) computations are executed on the replicated hardware so that computations may continue uninterrupted at least in the event of any single failure. However, the increased complexity of such systems has often made them practical only for the most mission-critical applications. Clustering techniques, though not always deployed strictly for purposes of availability improvement, have long been employed to allow two or more computers to operate together in such a way that they behave like a single computer. In general, clustering can be used for parallel processing, load balancing or fault tolerance. More recently, loosely coupled architectures have gained popularity. Typically, clustering software is employed in such systems to distribute load or coordinate failover amongst largely independent computer systems. In recent years, virtualization technology has presented new challenges for high-availability systems as more and more virtual servers are run concurrently on a single physical server. As a result, clustering techniques have been adapted to server virtualization.

SUMMARY

In accordance with an embodiment of the invention, a cloud computing system is disclosed. In an embodiment, the system includes a software-defined data center (SDDC), the SDDC including at least one cluster supported within the SDDC and at least one host computer running within the cluster, wherein the at least one host computer is configured to support at least one workload comprising an operating system and an application, and a cloud infrastructure, the cloud infrastructure including at least one child VM, the at least one child VM configured to virtualize the at least one host computer running within the cluster, and at least one parent virtual machine, wherein additional child VMs are deployed by forking the at least one parent VM.

In a second embodiment, the at least one parent VM is quiesced.

In another embodiment, the cloud computing system includes a parent VM deployed from a template of the at least one child VM.

In another embodiment, child VMs deployed in the cloud infrastructure support at least one host computer running within the cluster.

In another embodiment, the cloud computing system includes additional child VMs deployed when failure of VMs is detected.

In another embodiment, a failed VM is removed from the cloud infrastructure.

In another embodiment, a method for maintaining high availability of a plurality of virtual machines is disclosed. In an embodiment, the method involves detecting a failure of a virtual machine (VM) that is supporting a host computer in a cluster of a software-define data center (SDDC), forking a parent VM to create a child VM, configuring the child VM to support the host computer that was supported by the failed VM, and moving the host computer supported by the child VM into the cluster.

In another embodiment, the method further comprises deploying the parent VM in a cloud infrastructure with at least one child VM, the parent VM deployed from a template of the at least one child VM.

In another embodiment, deploying the parent VM comprises quiescing the parent VM.

In another embodiment, the method further comprises removing the failed VM from the cloud infrastructure.

In another embodiment, configuring the child VM comprises saving a configuration of the failed VM within the cluster of the SDDC while the failed VM is operable and loading the saved configuration into the child VM.

In another embodiment, loading the configuration of the failed VM into the child VM comprises retrieving a saved configuration of the failed VM from the SDDC and loading it into the child VM.

In another embodiment, a non-transitory computer-readable storage medium containing program instructions for maintaining high availability of a plurality of virtual machines, wherein execution of the program instructions by one or more processors of a computer system causes the one or more processors to perform steps including detecting a failure of a virtual machine (VM) that is supporting a host computer in a cluster of a software-define data center (SDDC), forking a parent VM to create a child VM, configuring the child VM, and adding host computers supported by the child VM into the cluster.

In another embodiment, the steps further comprise, deploying the parent VM in a cloud infrastructure with at least one VM, the parent VM deployed from a template of the at least one child VM.

In another embodiment, deploying the parent VM comprises quiescing the parent VM.

In another embodiment, the steps further comprise removing the failed VM from the cloud infrastructure.

In another embodiment, configuring the child VM involves saving a configuration of the failed VM within the cluster of the SDDC while the failed VM is operable and loading the saved configuration into the child VM.

In another embodiment, loading the configuration of the child VM into the child VM comprises retrieving a saved configuration of the failed VM from the SDDC and loading it into the child VM.

Other aspects and advantages of embodiments of the present invention will become apparent from the following

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
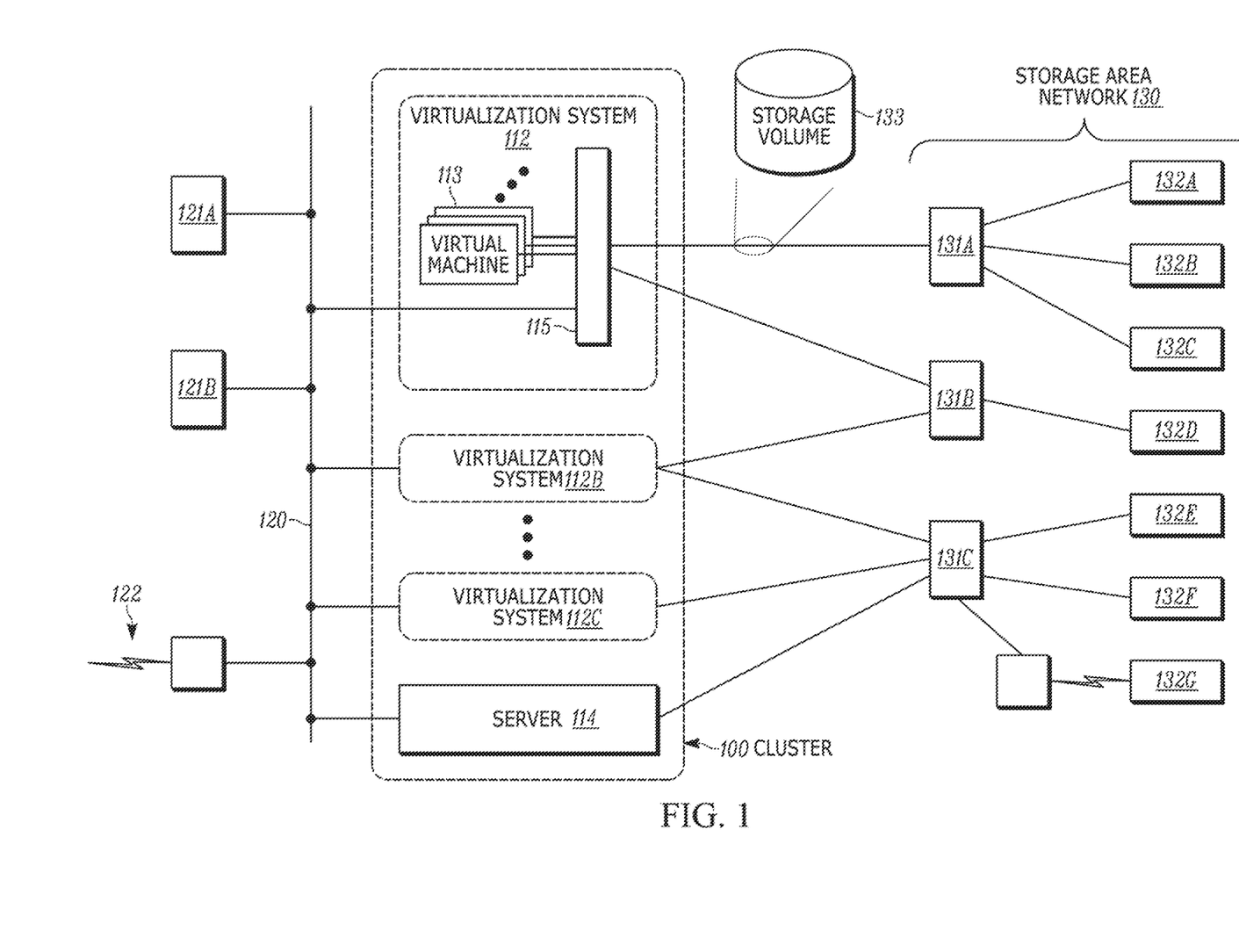
FIG. 1 depicts a cluster of a traditional physical data center.

FIG. 1 depicts a cluster of a traditional physical data center. In particular, FIG. 1 illustrates cluster 100 in which at least a collection of virtualization systems 112, 112B, 112C (but more generally, a mix of virtual machines 113 executing on host computers 115 (e.g., a server component of a virtual machine) and conventional hardware systems such as server 114) are configured to operate as a coordinated data center.

In the illustrated cluster configuration, constituent computational systems (e.g., virtualization systems 112, 112B, 112C and server 114) are coupled to network 120 which is illustrated (for simplicity) as a local area network with client systems 121A, 121B and communications interface 122, but will be more generally understood to represent any of a variety of networked information systems including configurations coupled to wide area networks and/or the Internet using any of a variety of communications media and protocols.

From the perspective of a client system such as client system 121A, cluster 100 may appear as one or more computer systems (presented, e.g., as application and/or file servers, database servers or services, other application services, network services, appliances, etc.). In general, neither the configuration of data centers as a cluster, nor the use of virtualization technology in the provisioning of underlying hardware to computational roles, needs to be apparent to a client system.

In the illustrated configuration, Storage Area Network (SAN) technology is employed for at least some storage needs of computational systems participating in the cluster. In general, network storage systems (including SAN-based system 130) provide a level of virtualization for underlying physical storage elements (e.g., individual disks, tapes and/or other media), where the characteristics and/or configuration of particular storage elements may be hidden from the systems that employ the storage. SAN-based systems typically provide an abstraction of storage pools from which individual storage units or volumes may be allocated or provisioned for block level I/O access. In the illustrated configuration, a switched fabric topology consistent with Fibre Channel SAN technology is shown in which switches 131A, 131B, 131C and/or directors are employed to mediate high bandwidth access (typically using a SCSI (Small Computer System Interface) command set) to an extensible and potentially heterogeneous set of storage resources 132A, 132B, 132C, 132D, 132E, 132F, 132G, e.g., SATA (Serial ATA) and/or SCSI disks, tape drives, as well as arrays thereof (e.g., RAID (Redundant Array of Inexpensive Disks)). Such resources may be distributed and (if desirable) may provide data replication and/or off-site storage elements. Fibre Channel is a gigabit-speed network technology standardized in the T11 Technical Committee of the International Committee for Information Technology Standards (INCITS).

In general, a variety of different types of interconnect entities, including directors, switches, hubs, routers, gateways, and bridges may be employed in topologies (or sub-topologies) that include point-to-point, arbitrated loop, switched fabric portions. Fibre Channel and non-Fibre Channel technologies including those based on iSCSI protocols (SCSI command set over TCP/IP) or ATA-over-ethernet (AoE) protocols may be employed in embodiments of the present invention. Similarly, any of a variety of media including copper pair, optical fiber, etc. may be employed in a network storage system such as SAN 130.

Although not specifically illustrated in FIG. 1, persons of ordinary skill in the art will recognize that physical storage is typically organized into storage pools, possibly in the form of RAID groups/sets. Storage pools are then subdivided into storage units (e.g. storage volumes such as a storage volume 133 in FIG. 1, which are then exposed to computer systems (e.g., as a SCSI LUN on a SAN communicating via Fibre Channel, iSCSI, etc.). In some environments, storage pools may be nested in a hierarchy, where pools are divided into sub-pools. In general, persons of ordinary skill in the art will understand the SCSI-derived term LUN (Logical Unit Number) to represent an address for an individual storage unit, and by extension, an identifier for a virtual disk of other storage devices presented by a network storage system such as SAN 130. By convention, we use the term LUN throughout this description; however, based on the description herein, persons of ordinary skill in the art will appreciate that we do so without limitation and any suitable identifier may be employed to identify an individual storage unit in embodiments of the present invention.

In a traditional HA system, underlying hardware (e.g., physical servers) has availability (e.g., available memory and/or processing power) equal to or in excess of a cluster's minimum capacity plus a cluster's desired availability. The minimum capacity is a minimum number of host computers that must be supported in a cluster. The desired availability is a number of additional host computers that the cluster can support, which translates to the number of host computers that can fail before workloads running on the cluster are affected.

Figure 2A:
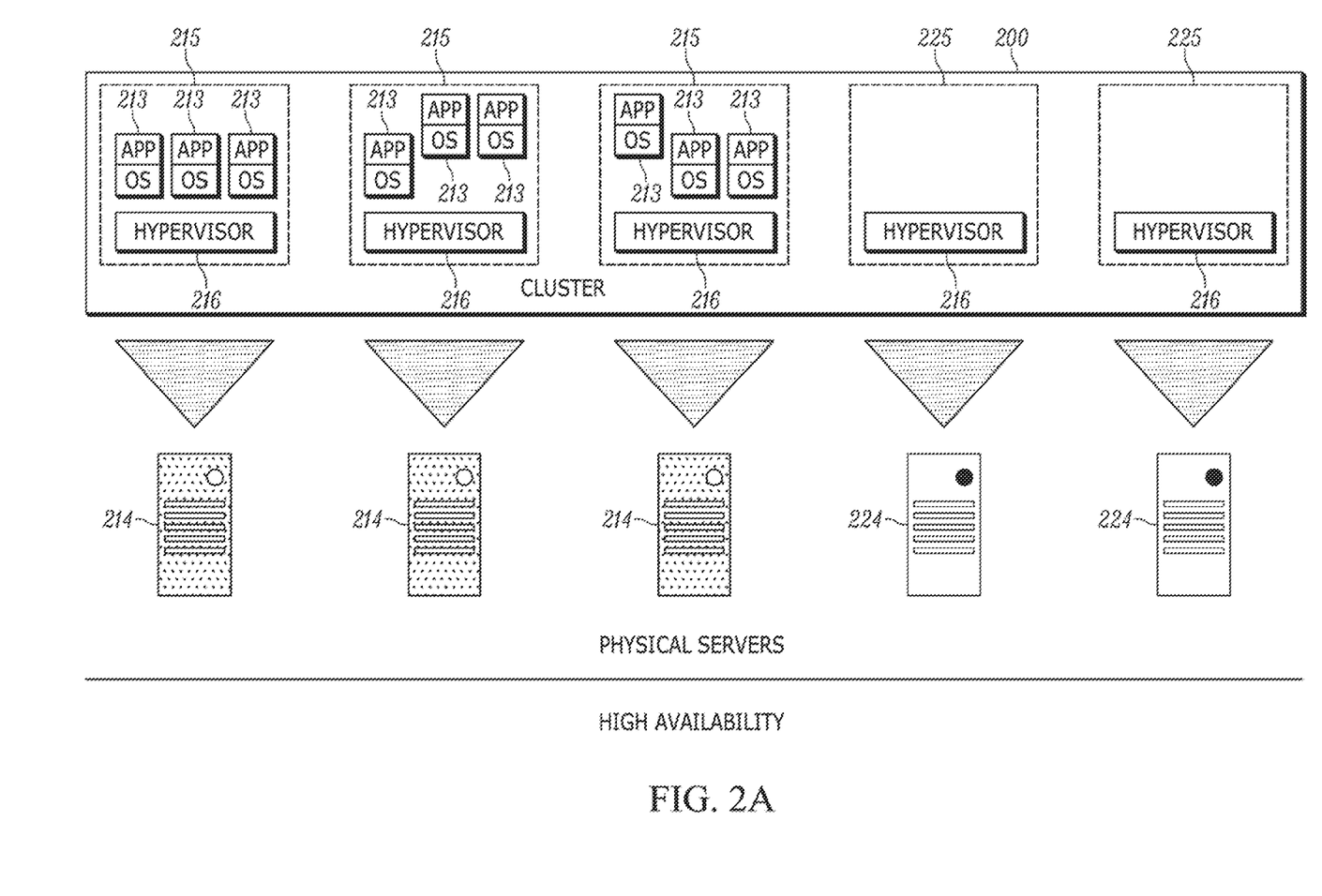
FIGS. 2A and 2B illustrate a failover scenario in a traditional high availability (traditional HA) system.
Figure 2B:
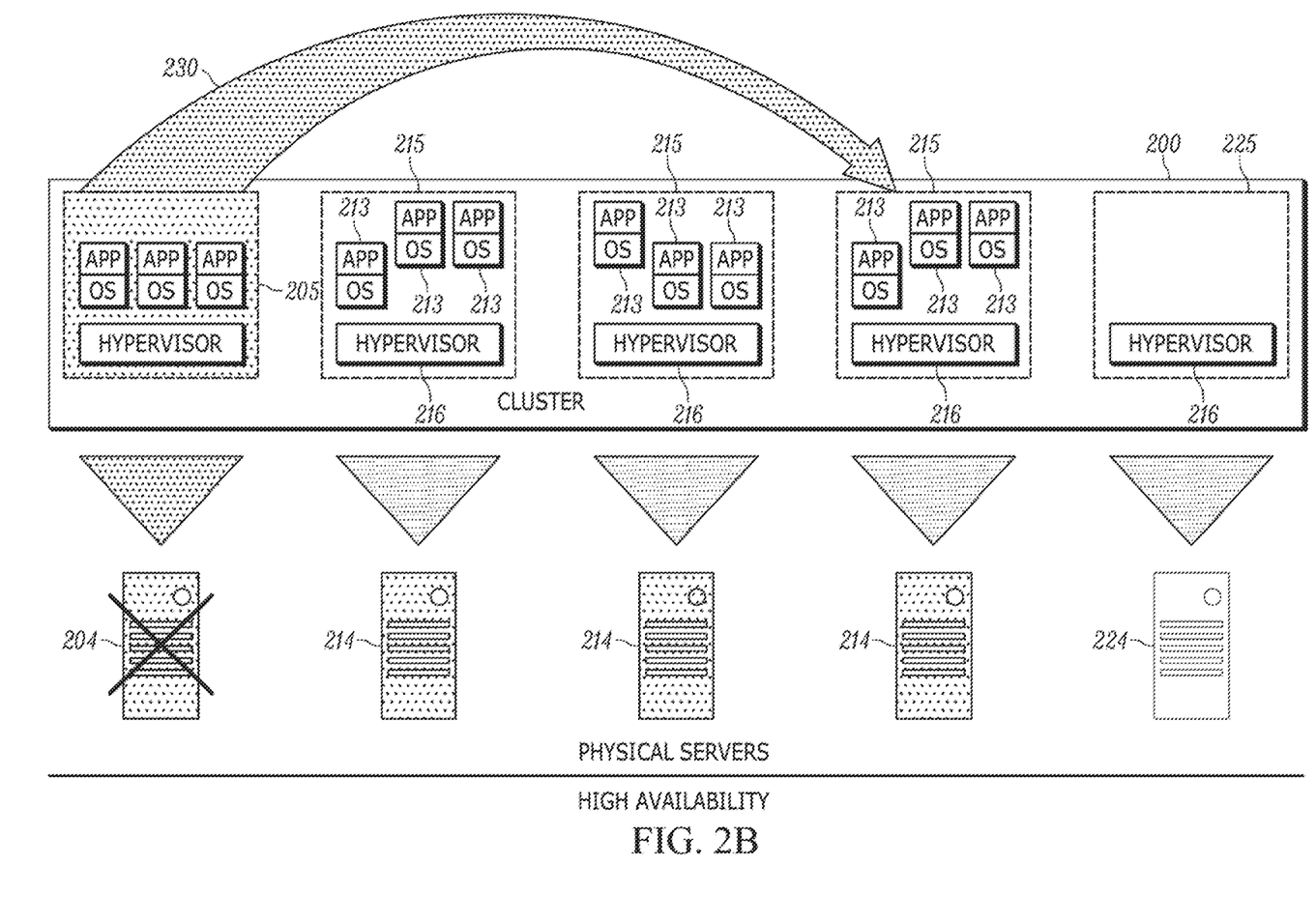

FIGS. 2A and 2B illustrate a failover scenario in a traditional high availability (traditional HA) system. As illustrated, the traditional HA system includes five physical servers (e.g., three active servers 214 and two reserve servers 224). The active servers support active host computers 215 in a cluster 200 (e.g., a host computer utilizes at least a portion of the computing resources of the physical server) and the reserve servers support reserve host computers 225. A host computer can be supported by a single physical server or by one or more physical servers. For simplicity, each host computer in FIG. 2A is supported by the single physical server located visually below it in the figure. The five host computers illustrated in FIG. 2A each run a hypervisor 216. A hypervisor can be, for example, a software layer that facilitates the virtualization of components of the host computers in underlying physical hardware. The hypervisors enable the host computers to run workloads 213. In an embodiment, a workload is an application (APP) running on an operating system (OS), typically within a virtual machine (VM). As illustrated, each active host computer runs three workloads.

The traditional HA system in FIG. 2A has a minimum capacity of three active host computers with a minimum availability of 66%. Thus, the traditional HA system has reserved computing resources available to support two additional host computers (e.g., 66% of the minimum capacity of the cluster). As illustrated in FIG. 2B, a physical server fails 204, thus taking an active host computer 205 offline. Accordingly, workloads running on the active host computer are also taken offline and restarted on one of the reserve host computers as indicated by the arrow 230.

In accordance with techniques known in the art, modern software-defined data centers (SDDCs) can be supported by a cloud infrastructure. In an embodiment, a cloud infrastructure can be an infrastructure-as-a-service solution, such as Amazon™ Web Services, Microsoft™ Azure, Google™ Compute Engine, or IBM™ SmartCloud, that includes a pool of computing resources such as servers, storage, or databases that can be rapidly accessed as needed. As needed, computing resources can be drawn from the pool and provisioned. For example, in a cloud infrastructure, physical servers can be replaced by VMs supported by computing resources drawn from the pool. Although the physical servers are now virtualized (e.g., virtual machines running on the cloud infrastructure), a failover solution similar to as described with reference to FIGS. 2A and 2B can still be applied.

Figure 3A:
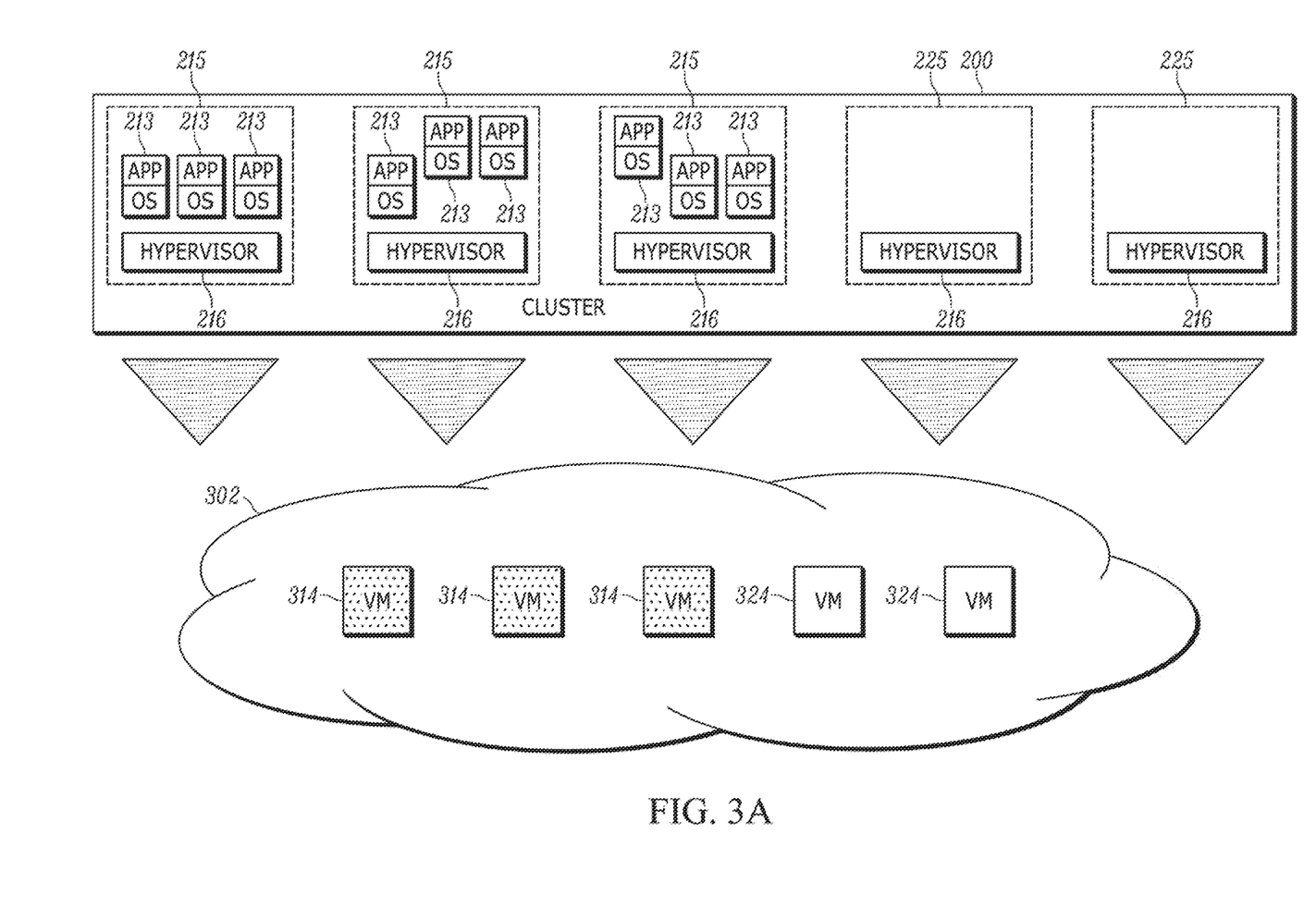
FIGS. 3A and 3B illustrate a failover scenario in a traditional HA system supported by a cloud infrastructure.
Figure 3B:
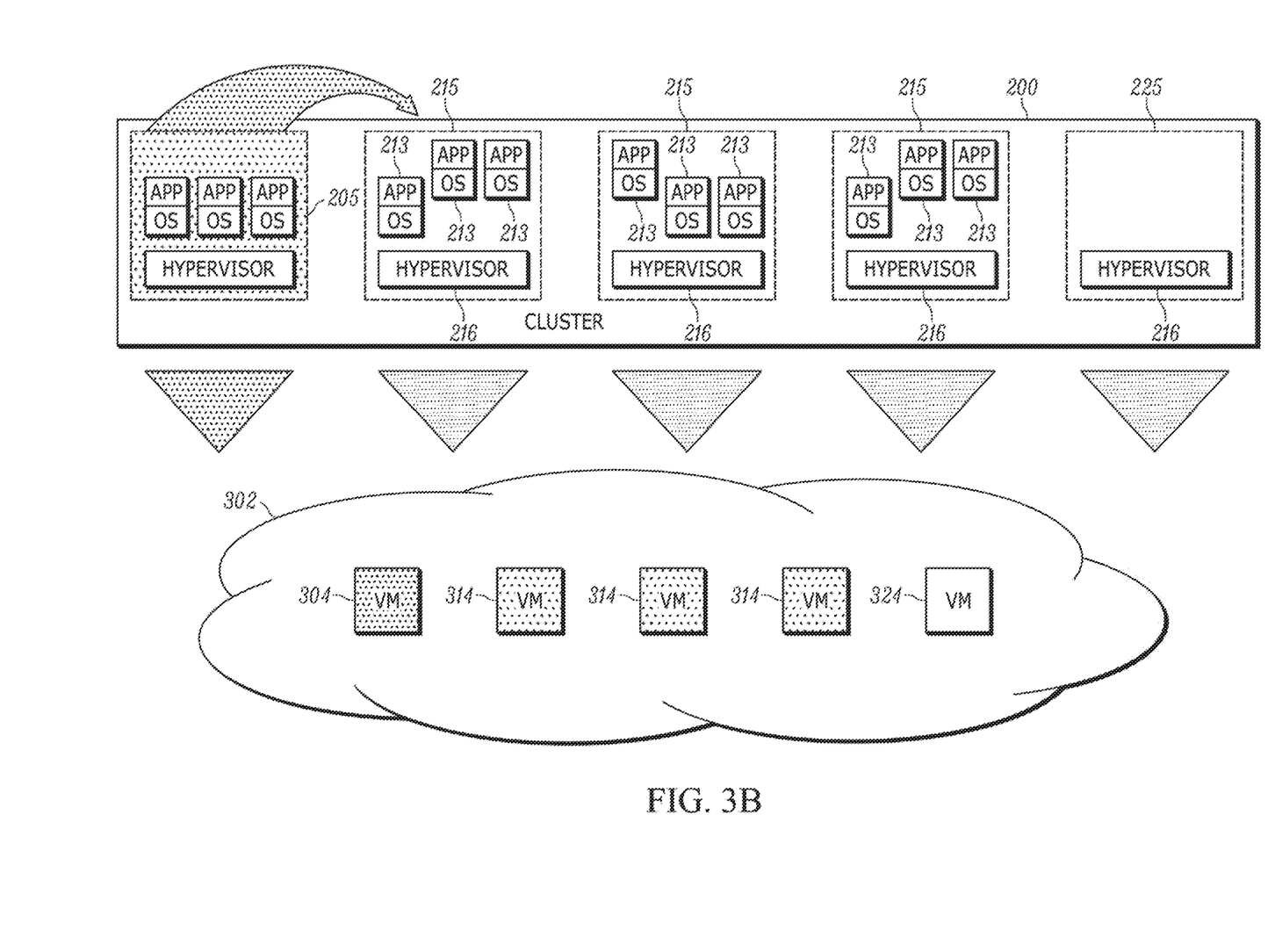

FIGS. 3A and 3B illustrate a failover scenario in a traditional HA system supported by a cloud infrastructure. Similar to the traditional HA system in FIGS. 2A and 2B, a cluster includes several active host computers 215 running workloads 213 as well as several reserve host computers 225. However, unlike the traditional HA system in FIGS. 2A and 2B, the traditional HA system in FIGS. 3A and 3B is supported by a cloud infrastructure 302 and, rather than using physical servers, each active host computer is supported by one or more active VMs 314 and each reserve host computer is supported by one or more reserve VMs 324 running in the cloud infrastructure 302. As illustrated in FIG. 3B, when an active VM running in the cloud infrastructure fails 304, one of the reserve VMs becomes active and the workloads 213 that were running on the active host supported by the failed active VM can be restarted on the now active VM.

Supporting an HA system in a cloud infrastructure may reduce the cost of implementation because computing resources in a cloud infrastructure are easier to acquire and store (e.g., instantly with no storage space required) than their physical counterparts. However, the solution may still be wasteful because virtual computing resources held in reserve are not being utilized despite the fee paid to acquire those computing resources and additional cost to configure and operate those computing resources.

In accordance with an embodiment of the invention, a cloud computing system is disclosed. In an embodiment, the system includes a software-defined data center (SDDC), the SDDC including at least one cluster supported within the SDDC and at least one host computer running within the cluster, wherein the at least one host computer is configured to support at least one workload comprising an operating system and an application, and a cloud infrastructure, the cloud infrastructure including at least one child VM, the at least one child VM configured to virtualize the at least one host computer running within the cluster, and at least one parent virtual machine, wherein additional child VMs are deployed by forking the at least one parent VM. In an embodiment, additional child VMs are deployed in the cloud infrastructure when failure of a child VM is detected. Computing resources for the additional child VMs can be reserved at the time of deployment and may not need to be held in reserve. Furthermore, additional child VMs can be provisioned using the parent VM as a template and deployed in near real-time within a cloud infrastructure. Since an effectively limitless number of child VMs can be deployed in a cloud infrastructure, true HA can be achieved. That is, an additional child VM can be added on-demand as soon as any number of child VM fails. As a result, a cluster can be supported by the exact number of child VMs needed without holding additional child VMs in reserve providing a more efficient solution than a traditional HA system.

Figure 4A:
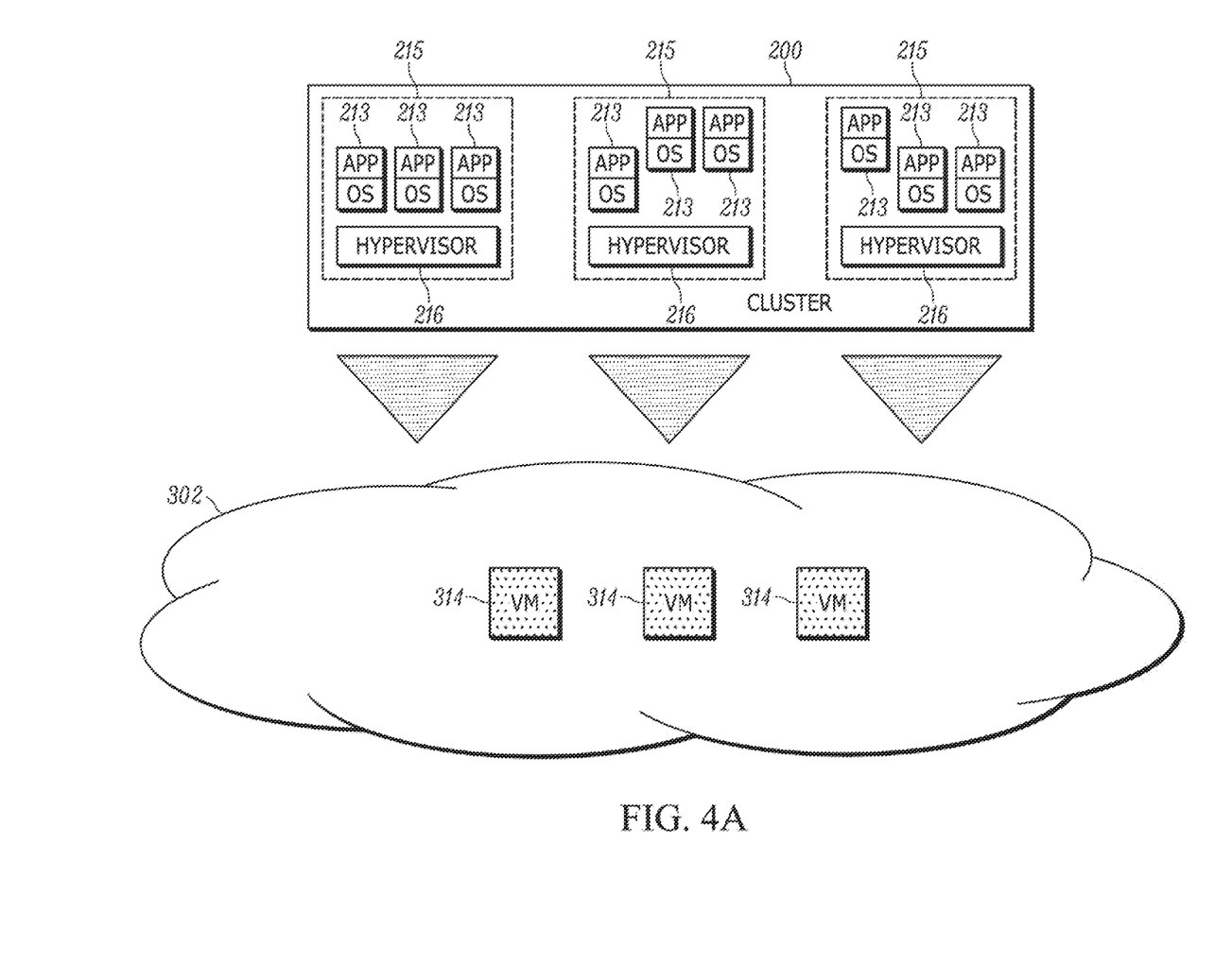
FIGS. 4A and 4B illustrate a failover scenario in a true HA system supported by a cloud infrastructure.
Figure 4B:
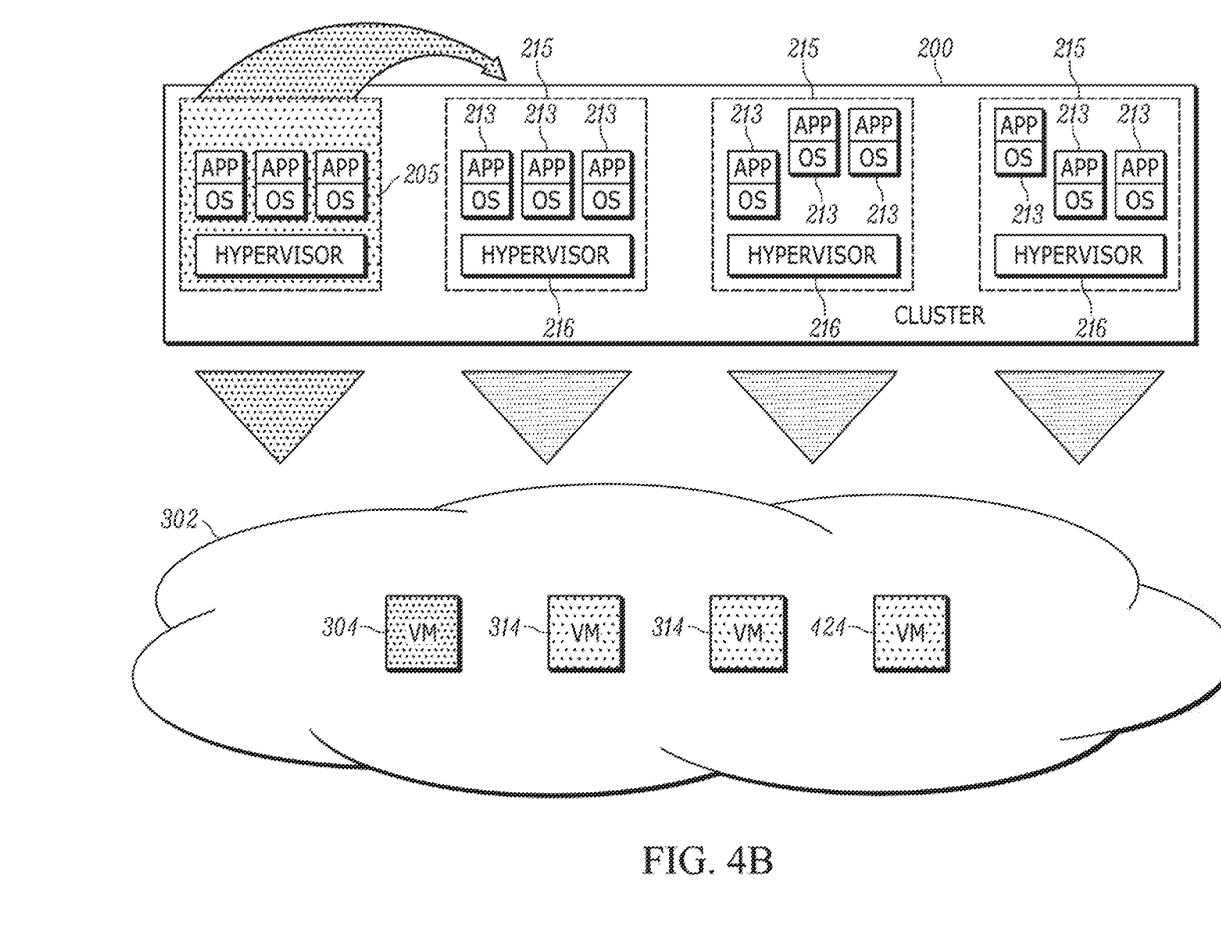

FIGS. 4A and 4B illustrate a failover scenario in a true HA system supported by a cloud infrastructure. Similar to the traditional HA system in FIGS. 3A and 3B, the true HA system is supported by a cloud infrastructure 302 and, rather than using physical servers, each host computer 215 is supported by one or more VMs 314 running in the cloud infrastructure. Unlike the traditional HA system in FIGS. 3A and 3B, which holds two VMs in reserve, the true HA system in FIGS. 4A and 4B need not hold any VMs in reserve. In FIG. 4B, when a VM running in the cloud infrastructure fails 304, another VM 424 can be quickly provisioned and deployed. The new VM 424 can be configured and the failed workloads that were running on the host computer 205 running in the failed VM can be restarted on the newly configured VM. In an embodiment, the failed VM can be removed from the cluster and the number of VMs deployed in the cloud infrastructure remains constant. That is, when one VM fails, one new VM is provisioned and deployed and the failed VM is removed. In other embodiments, the failed VM can remain in the cloud infrastructure or multiple new VMs can be provisioned and deployed when one VM fails.

Figure 5:
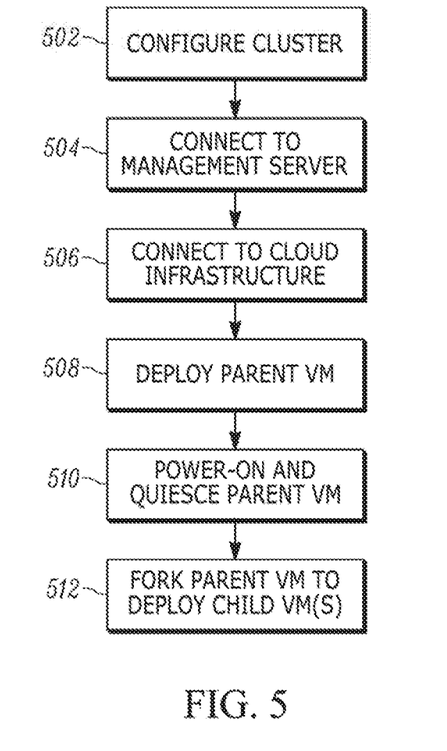
FIG. 5 is a flow chart diagram of steps for configuring a true HA system.

FIG. 5 is a flow chart diagram of steps for configuring a true HA system. At step 502, a cluster is configured. Configuring a cluster defines the profiles for each host computer running in the cluster. In an embodiment, configurations of hypervisor instances of host computers running in the cluster are saved in the SDDC in which the cluster is located (e.g., in memory allocated to the SDDC). At step 504, a connection is established to a management server and, at step 506, a connection is established to a cloud infrastructure. At step 508, a VM is deployed in the cloud infrastructure as a "parent VM". In an embodiment, VMs needed to support the cluster configured at step 502 are already deployed in the cloud infrastructure and the parent VM is deployed from a template of those VMs. At step 510, the parent VM is powered-on and quiesced. Then, as needed, the parent VM can be forked to deploy child VMs at step 512.

Figure 6:
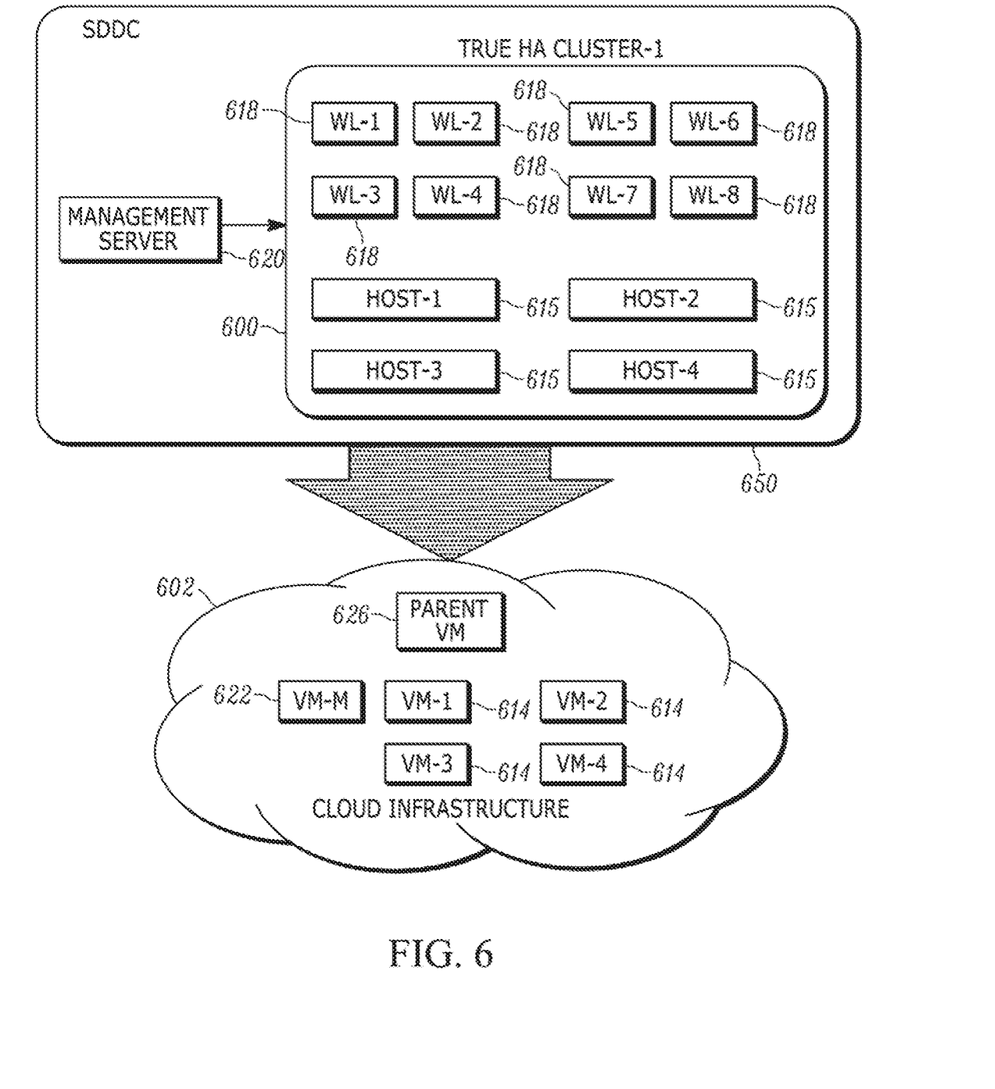
FIG. 6 illustrates a true HA system configured according to the steps of FIG. 5.

FIG. 6 illustrates a true HA system configured according to the steps of FIG. 5. In an embodiment, the system includes two main parts: a SDDC 650 and a cloud infrastructure 602. The cloud infrastructure includes VMs 614, a parent VM 626, and a management VM ("VM-M") 622. Initially, the SDDC is configured with a management server 620 and four host computers 615 in a cluster 600 supporting various workloads 618. As illustrated in FIG. 6, four VMs (e.g., VM-1 through VM-4) are provisioned in the cloud infrastructure. In an embodiment, the VMs are provisioned from a template (not shown) defined for a given cluster and configured with hypervisors. Once the SDDC and cloud infrastructure are configured. HA functionality is added by deploying a fifth VM as the "parent" VM, which is provisioned using the same template as the other VMs. The parent VM is then quiesced.

Figure 7:
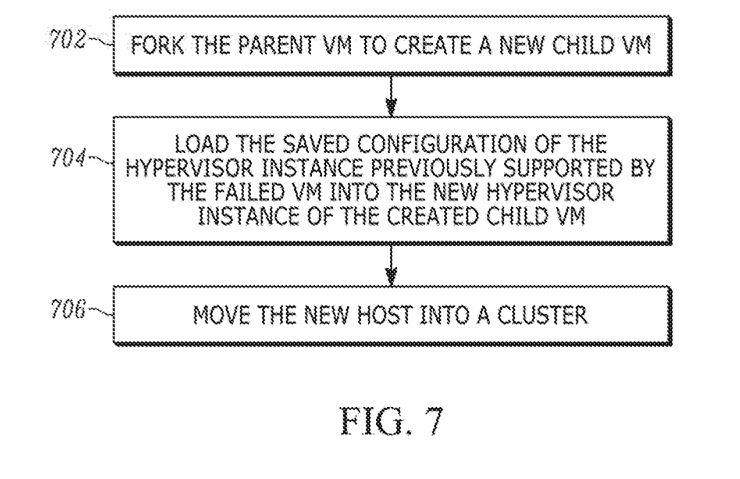
FIG. 7 is a flow chart diagram of a process for forking a parent VM to deploy child VMs.

FIG. 7 is a flow chart diagram of a process for forking a parent VM to deploy child VMs. When failure of a child VM is detected, at block 702, the parent VM is forked and a child VM is created. In an embodiment, the child VM has a new hypervisor instance. At block 704, the child VM is configured by loading the saved configuration of the hypervisor instance previously supported by the failed VM into the new hypervisor instance of the created child VM. At block 706, the new host computer is moved to a cluster. In an embodiment, the cluster is the cluster in which the failure is detected.

Figure 8:
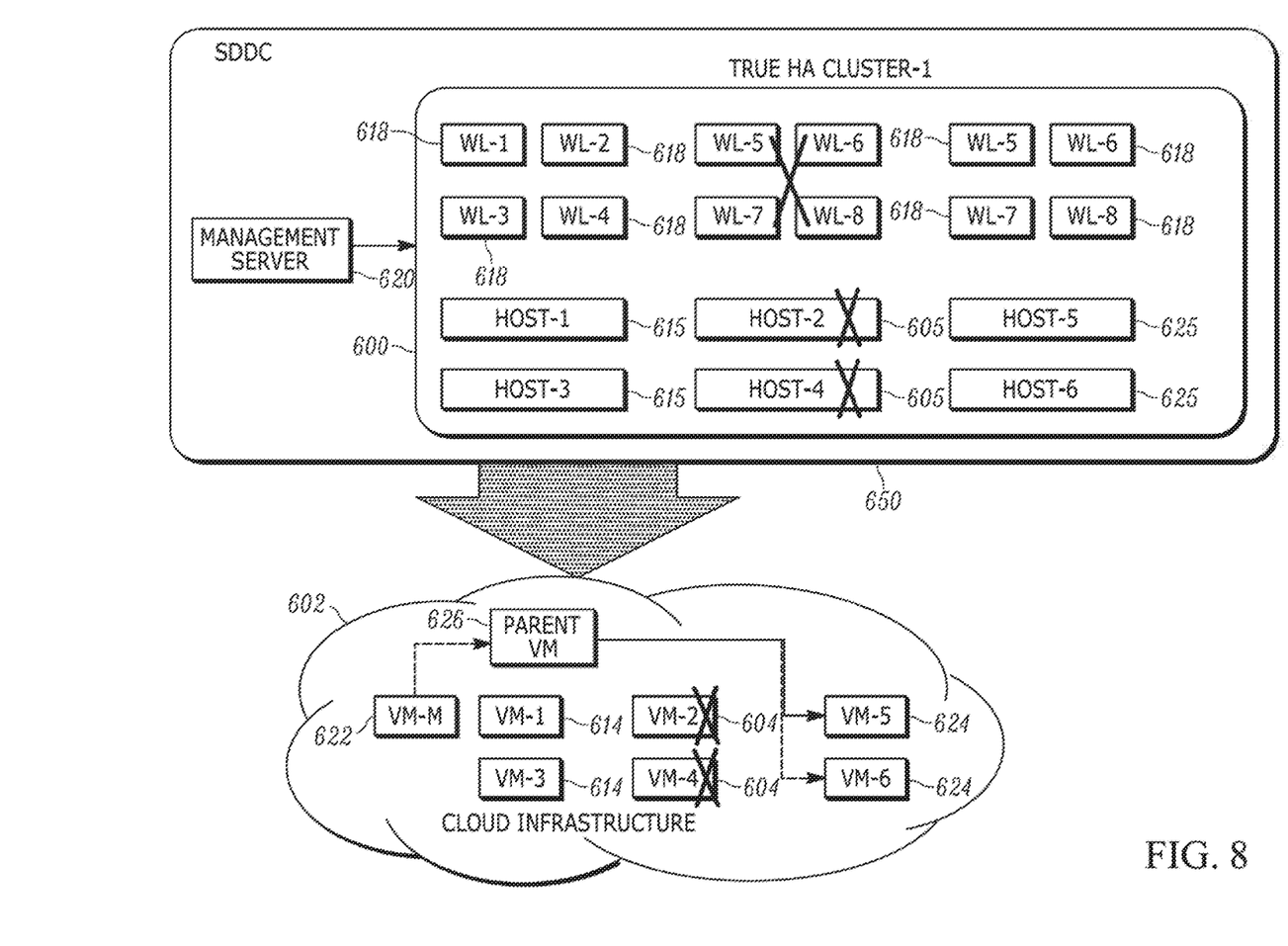
FIG. 8 illustrates a failover scenario in a true HA system utilizing the forking process according to the steps of FIG. 7.

FIG. 8 illustrates a failover scenario in a true HA system utilizing the forking process according to the steps of FIG. 7. When a VM running in the cloud infrastructure fails 604, another VM can be quickly provisioned and deployed. As illustrated in FIG. 8, when VM-2 and VM-4 fail, corresponding host computers fail 605 (e.g., Host-2 and Host-4) and workloads WL-5 through WL-8 would be interrupted or otherwise affected. When a management server 620 monitoring the cluster in the SDDC detects the failure, the underlying VM-M 622 supporting the management server forks the parent VM to create child VM-5 and child VM-6 624. Because VM-5 and VM-6 are created by forking the parent VM, VM-5 and VM-6 are already provisioned with the provisioning information of the parent VM, which matches the provisioning information of the failed VMs. Once created, new hypervisor instances of VM-5 and VM-6 are configured by loading the hypervisor instances from Host-2 and Host-4, and the new host computers Host-5 and Host-6 (625) are moved into the cluster 600. Workloads WL-5 through WL-8 are restarted on the new host computers.

Figure 9:
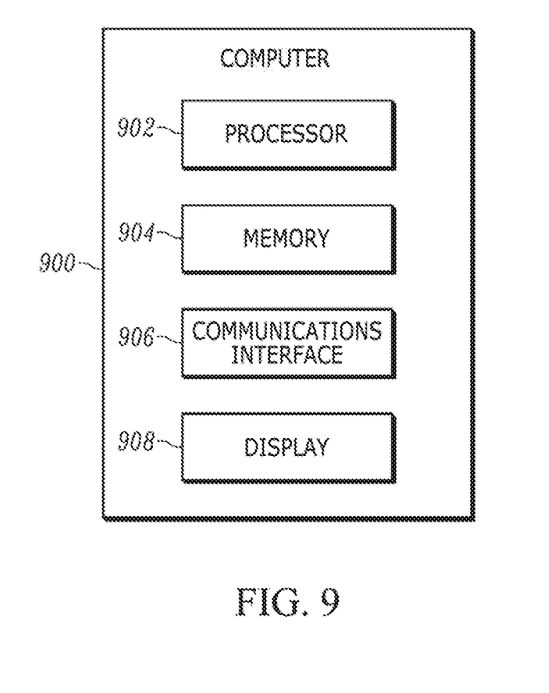
FIG. 9 depicts a computer that includes a processor, memory, a communications interface, and a display.

FIG. 9 depicts a computer 900 that includes a processor 902, memory 904, a communications interface 906, and a display 908. The processor may include a multifunction processor and/or an application-specific processor. Examples of processors include the PowerPC™ family of processors by IBM and the x86 family of processors by Intel such as the Xeon™ family of processors and the Intel X5650 processor. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, a magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for maintaining high availability of a plurality of virtual machines, the method comprising:
    configuring a cluster of a software-define data center (SDDC) by defining a profile for each of a first host computer, a second host computer, a third host computer, and a fourth host computer running in the cluster, wherein at least one of the first host computer, the second host computer, the third host computer, and the fourth host computer is configured to support at least one workload comprising an operating system and an application;
    after configuring the cluster of the SDDC, establishing a connection to a management server;
    after establishing the connection to the management server, establishing a connection to a cloud infrastructure;
    after establishing the connection to the cloud infrastructure, deploying a first virtual machine (VM), a second VM, a third VM, and a fourth VM needed to support the cluster in the cloud infrastructure by provisioning the first, second, third, and fourth VMs from a defined template and configuring the first, second, third, and fourth VMs with a plurality of hypervisors;
    after the first, second, third, and fourth VMs needed to support the cluster are deployed in the cloud infrastructure, deploying a parent VM to be forked when a VM failure is detected in the cloud infrastructure from the defined template of the deployed first, second, third, and fourth VMs in the cloud infrastructure;
    after deploying the parent VM, detecting a failure of the first VM and the second VM of the deployed first, second, third, and fourth VMs that are supporting the first host computer and the second host computer in the cluster of the SDDC using the management server monitoring the cluster of the SDDC;
    in response to the failure of the first VM and the second VM, forking the parent VM to create a first child VM and a second child VM in the cloud infrastructure using a management VM in the cloud infrastructure supporting the management server, wherein the first VM and the second VM, which are deployed in the cloud infrastructure prior to the deployment of the parent VM in the cloud infrastructure, are not child VMs of the parent VM, wherein provisioning information of the parent VM matches provisioning information of the first VM and the second VM, and wherein no VM is held in reserve in the cloud infrastructure;
    after forking the parent VM, loading a configuration of a plurality of hypervisor instances associated with the first VM and the second VM into a plurality of hypervisor instances of the first child VM and the second child VM, wherein each hypervisor comprises a software layer that facilitates a virtualization of components of a corresponding host computer in underlying physical hardware;
    after loading the configuration of the hypervisor instances associated with the first VM and the second VM into the hypervisor instances of the first child VM and the second child VM, moving a fifth host computer and a sixth host computer corresponding to the first child VM and the second child VM into the cluster and restarting a first workload, a second workload, a third workload, and a fourth workload, which were running on the first host computer and the second host computer supported by the first VM and the second VM, on the fifth host computer and the sixth host computer, wherein when the first VM and the second VM fail, the first and second host computers fail and the first workload, the second workload, the third workload, and the fourth workload are interrupted; and
    removing the first VM and the second VM from the cloud infrastructure, wherein the cloud infrastructure is an infrastructure-as-a-service solution that includes a pool of computing resources, wherein multiple new VMs are provisioned and deployed when one VM fails, and wherein computing resources for additional child VMs are reserved at time of deployment.

2. The method of claim 1, wherein deploying the parent VM comprises quiescing the parent VM.

3. A non-transitory computer-readable storage medium containing program instructions for maintaining high availability of a plurality of virtual machines, wherein execution of the program instructions by one or more processors of a computer system causes the one or more processors to perform steps comprising:
    configuring a cluster of a software-define data center (SDDC) by defining a profile for each of a first host computer, a second host computer, a third host computer, and a fourth host computer running in the cluster, wherein at least one of the first host computer, the second host computer, the third host computer, and the fourth host computer is configured to support at least one workload comprising an operating system and an application;
    after configuring the cluster of the SDDC, establishing a connection to a management server;
    after establishing the connection to the management server, establishing a connection to a cloud infrastructure;
    after establishing the connection to the cloud infrastructure, deploying a first virtual machine (VM), a second VM, a third VM, and a fourth VM needed to support the cluster in the cloud infrastructure by provisioning the first, second, third, and fourth VMs from a defined template and configuring the first, second, third, and fourth VMs with a plurality of hypervisors;
    after the first, second, third, and fourth VMs needed to support the cluster are deployed in the cloud infrastructure, deploying a parent VM to be forked when a VM failure is detected in the cloud infrastructure from the defined template of the deployed first, second, third, and fourth VMs in the cloud infrastructure;

after deploying the parent VM, detecting a failure of the first VM and the second VM of the deployed first, second, third, and fourth VMs that are supporting the first host computer and the second host computer in the cluster of the SDDC using the management server monitoring the cluster of the SDDC;

in response to the failure of the first VM and the second VM, forking the parent VM to create a first child VM and a second child VM in the cloud infrastructure using a management VM in the cloud infrastructure supporting the management server, wherein the first VM and the second VM, which are deployed in the cloud infrastructure prior to the deployment of the parent VM in the cloud infrastructure, are not child VMs of the parent VM, wherein provisioning information of the parent VM matches provisioning information of the first VM and the second VM, and wherein no VM is held in reserve in the cloud infrastructure;

after forking the parent VM, loading a configuration of a plurality of hypervisor instances associated with the first VM and the second VM into a plurality of hypervisor instances of the first child VM and the second child VM, wherein each hypervisor comprises a software layer that facilitates a virtualization of components of a corresponding host computer in underlying physical hardware;

after loading the configuration of the hypervisor instances associated with the first VM and the second VM into the hypervisor instances of the first child VM and the second child VM, adding a fifth host computer and a sixth host computer corresponding to the first child VM and the second child VM into the cluster and restarting a first workload, a second workload, a third workload, and a fourth workload, which were running on the first host computer and the second host computer supported by the first VM and the second VM, on the fifth host computer and the sixth host computer, wherein when the first VM and the second VM fail, the first and second host computers fail and the first workload, the second workload, the third workload, and the fourth workload are interrupted; and removing the first VM and the second VM from the cloud infrastructure, wherein the cloud infrastructure is an infrastructure-as-a-service solution that includes a pool of computing resources, wherein multiple new VMs are provisioned and deployed when one VM fails, and wherein computing resources for additional child VMs are reserved at time of deployment.

4. The non-transitory computer-readable storage medium of claim 3, wherein deploying the parent VM comprises quiescing the parent VM.

5. The method of claim 1, wherein the configurations of the hypervisor instances of the first, second, third and fourth host computers running in the cluster are saved in memory allocated to the SDDC in which the cluster is located.

6. The non-transitory computer-readable storage medium of claim 3, wherein the configurations of the hypervisor instances of the first, second, third and fourth host computers running in the cluster are saved in memory allocated to the SDDC in which the cluster is located.

7. The method of claim 1, wherein no VM is held in reserve and running in the cloud infrastructure.

8. The method of claim 7, wherein the cluster of the SDDC is supported by an exact number of the child VMs needed without holding additional child VMs in reserve and running in the cloud infrastructure.

9. The method of claim 1, wherein true high availability (HA) functionality is added by deploying the parent VM, which is provisioned using the same template as the first, second, third, and fourth VMs needed to support the cluster.

10. The method of claim 1, wherein each of the hypervisors is a software layer that facilitates virtualization of components of host computers in underlying physical hardware.

11. The method of claim 1, wherein true high availability (HA) is achieved by deploying a number of child VMs in the cloud infrastructure.

12. The method of claim 1, wherein no VM is held in reserve and running in the cloud infrastructure, and wherein true high availability (HA) functionality is added by deploying the parent VM, which is provisioned using the same template as the first, second, third, and fourth VMs needed to support the cluster, and deploying a number of child VMs in the cloud infrastructure.

* * * * *